United States Patent [19]

Muramatsu

[11] Patent Number: 4,766,885
[45] Date of Patent: Aug. 30, 1988

[54] SOLAR WATER HEATER

[75] Inventor: Toshiaki Muramatsu, Oyama, Japan

[73] Assignee: Showa Aluminum Corporation, Osaka, Japan

[21] Appl. No.: 943,883

[22] Filed: Dec. 19, 1986

Related U.S. Application Data

[63] Continuation of Ser. No. 749,911, Jun. 28, 1985.

[30] Foreign Application Priority Data

| Jun. 29, 1984 [JP] Japan | 59-136221 |
| Jun. 29, 1984 [JP] Japan | 59-136222 |
| Jun. 29, 1984 [JP] Japan | 59-136223 |
| Jul. 2, 1984 [JP] Japan | 59-137811 |

[51] Int. Cl.$^4$ ............................................. F24J 2/32
[52] U.S. Cl. ................................. 126/433; 165/104.21
[58] Field of Search ..................... 26/433; 165/104.21

[56] References Cited

U.S. PATENT DOCUMENTS

| 4,004,573 | 1/1977 | Frieling et al. | 126/435 |
| 4,235,287 | 11/1980 | Kleine et al. | 165/170 |
| 4,253,446 | 3/1981 | Muller | 126/437 |
| 4,438,759 | 3/1984 | Kitajima et al. | 126/433 |
| 4,505,261 | 3/1985 | Hunter | 126/448 |
| 4,513,732 | 4/1985 | Feldman | 126/434 |

FOREIGN PATENT DOCUMENTS 59-34849 9/1984 Japan .

Primary Examiner—Carroll B. Dority, Jr.
Attorney, Agent, or Firm—Armstrong, Nikaido, Marmelstein & Kubovcik

[57] ABSTRACT

A solar water heater comprising at least one casing having housed therein a heat collector of the heat pipe type having a condenser portion and a heat receiving tank for receiving heat from the condenser portion of the collector, and a hot water tank disposed outside the casing. The heat receiving tank is in communication with the hot water tank by a supply pipe and a return pipe to heat water in the hot water tank with the heat of a liquid within the heat receiving tank.

9 Claims, 10 Drawing Sheets

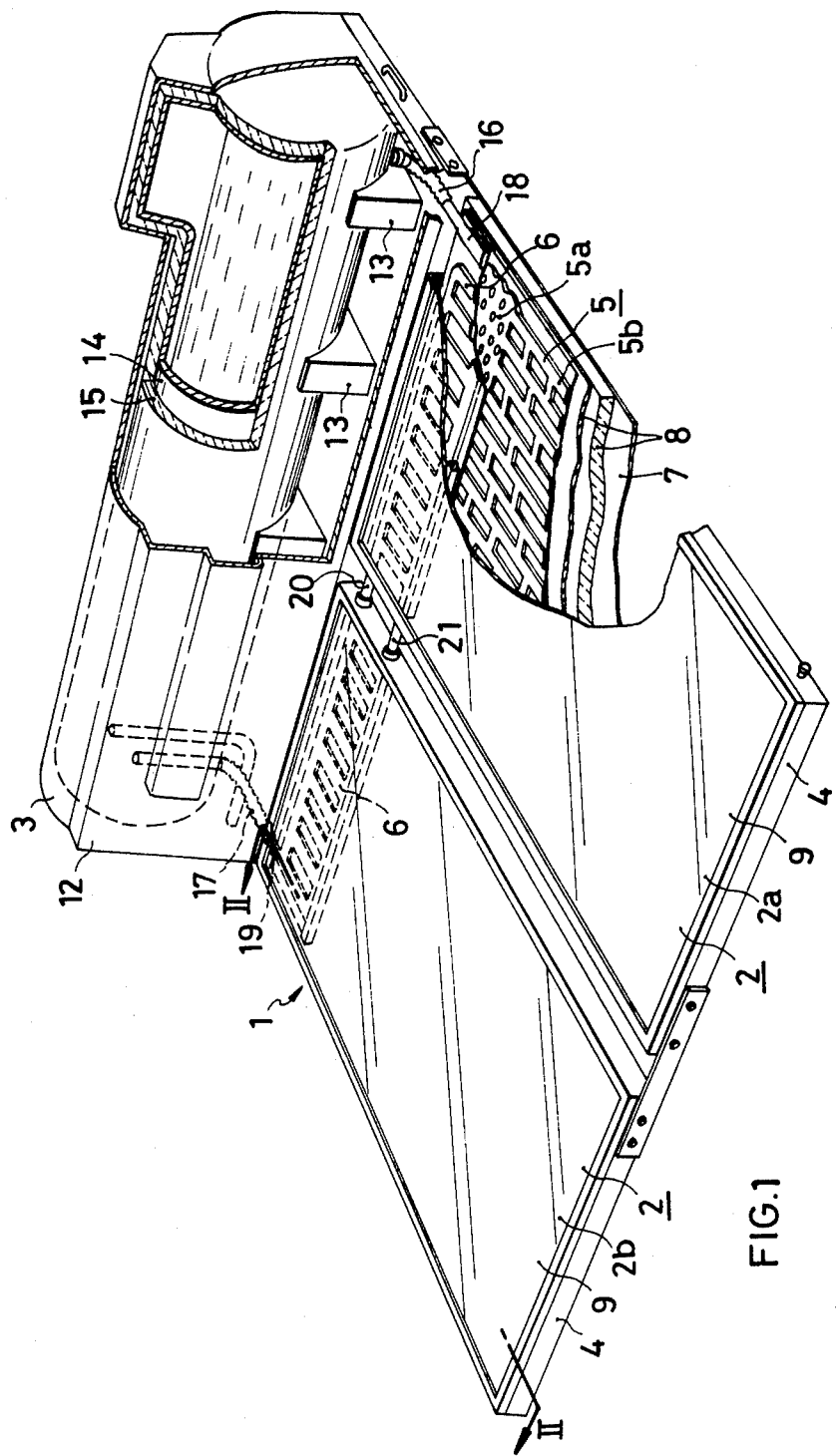

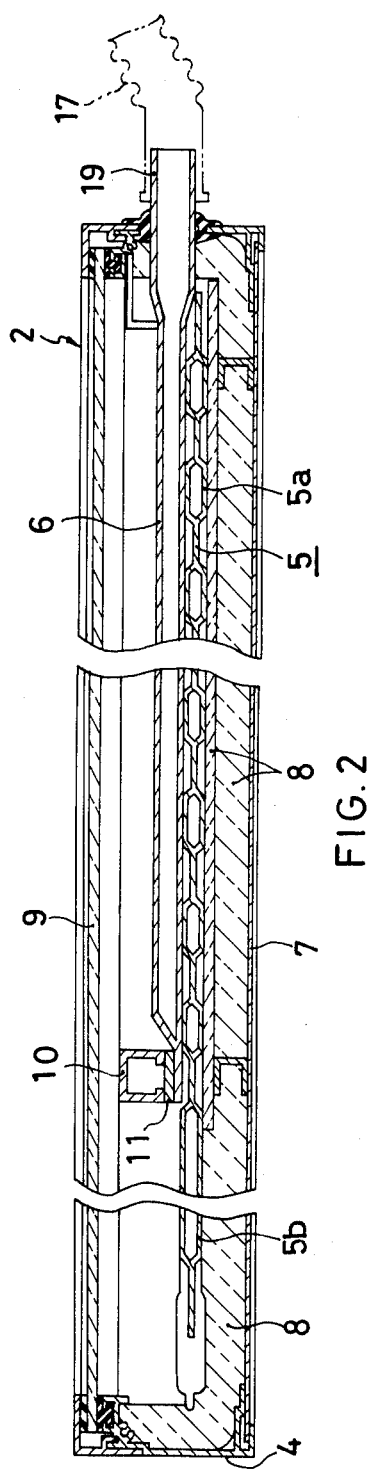
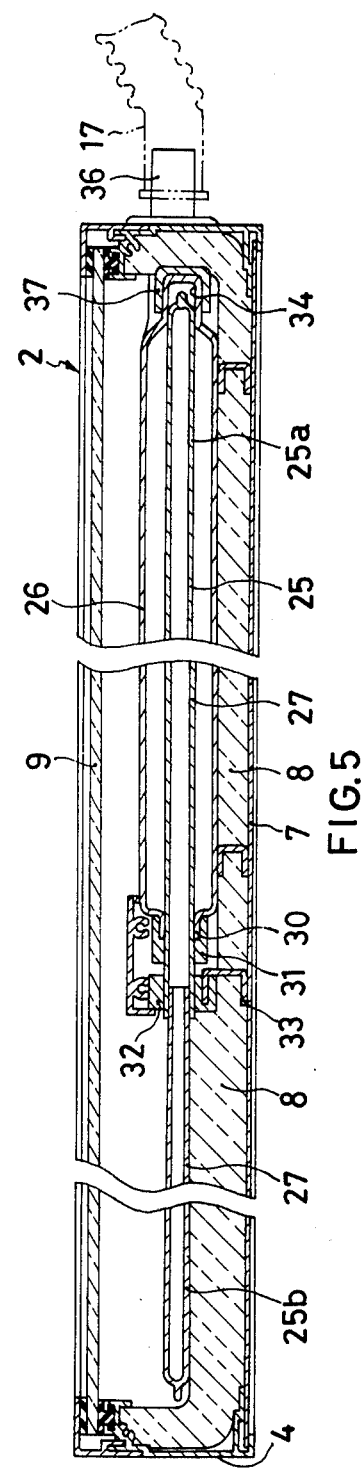

SOLAR WATER HEATER

This application is a continuation of application Ser. No. 749,911 filed 6/28/85.

BACKGROUND OF THE INVENTION

The present invention relates to a solar water heater.

Solar water heaters are known which comprise a heat collector of the heat pipe type and a hot water tank. Because the condenser portion of the collector is held in contact with the bottom metal plate of the tank or inserted in the tank, the conventional solar water heater has the problem that a heat loss is liable to occur owing to the release of heat from the collector during night when no solar heat is available. Further with the conventional heater, a heat collector unit having the collector and a hot water storage unit including the tank are in the form of an integral assembly which has such a peculiar shape that the storage unit is projected upward from the rear end of a case. Additionally, the heater, which is heavy, is not balanced in weight since the storage unit is heavier. Thus, the heater is cumbersome to handle or treat and is not easy to package and transport. When such heaters are arranged as stacked up for storage, useless spaces occur to necessitate a large space for storage. The heater has another problem in that when water leaks from the tank or other portion, the heater must be repaired by a very cumbersome procedure because it has an integral structure.

An indirect solar water heater is also known which comprises a solar heat collector placed on the roof for heating an antifreeze solution or like heating medium, and a hot water tank having a radiator and disposed under the roof for heating water with the hot heating medium passed through the radiator. The collector comprises collector tubes having fins and arranged in parallel for passing the heating medium therethrough, and a pair of headers connected to opposite ends of the collector tubes. With this collector, however, the collector tubes including the fins and the headers are liable to release heat from the surface during night when no solar heat is available, consequently cooling the medium and resulting in a great heat loss. Thus, the heater of this type is inefficient. Moreover, the collector is not easy to fabricate because there are many weld joints between the headers and the collector tubes, while the collector is susceptible to leakage, for example, due to improper welding. It is cumbersome to repair when a leak develops. The collector is further inefficient since solar heat is not collected by the pair of header portions, while the collector is not compact owing to the presence of the headers.

SUMMARY OF THE INVENTION

The present invention has been accomplished to overcome the foregoing problems. The invention provides a solar water heater which comprises at least one casing having housed therein a heat collector of the heat pipe type having a condenser portion and a heat receiving tank for receiving heat from the condenser portion of the collector, and a hot water tank disposed outside the casing, the heat receiving tank being connected to the hot water tank by heat transfer means to heat water in the hot water tank with the heat of a liquid within the heat receiving tank. Because of this structure, the heater is greatly reduced in heat loss due to the release of heat during nighttime and effectively utilizes solar heat.

The solar water heater comprises a heat collector unit including the heat collector and the heat receiving tank, and a hot water storage unit including the hot water tank. These two units are fabricated separately. When water is to be filled into the heat receiving tank, this tank is connected to the hot water tank by supply and return pipes. The heater is therefore easy to handle, to install on the roof and to repair. Further it is very easy to package and transport. The heater can be stored in a greatly reduced space because the collector unit and the storage unit can be stowed separately.

The heat pipe-type collector and the heat receiving tank are fabricated separately, so that when a heating medium is to be used, the medium needs only to be admitted into the heat receiving tank and into a radiator or heat exchanger (which is conventionally used) for the hot water tank. This makes it possible to prepare the collector and the heat receiving tank without resorting to the welding operation conventionally used, consequently rendering the heater correspondingly easier to fabricate and less prone to leakage.

The present invention will be described in greater detail with reference to the accompanying drawings.

BRIEF DESCRIPTION OF THE DRAWINGS

FIG. 1 is a perspective view partly broken away and showing a solar water heater according to the invention;

FIG. 2 is an enlarged fragmentary view in section taken along the line II—II in FIG. 1;

FIG. 5 is an enlarged fragmentary view in section showing another embodiment of solar water heater of the invention;

DESCRIPTION OF THE PREFERRED EMBODIMENTS

Figure 3:
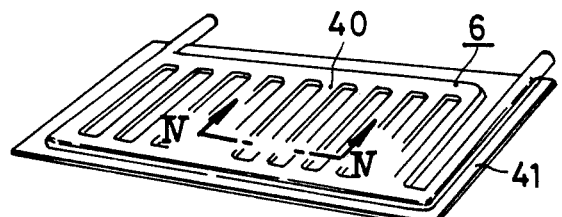
FIG. 3 is a perspective view showing the heat receiving tank only of FIG. 1.

The terms "front" and "rear" as herein used are based on FIG. 2. "Front" refers to the left side of FIG. 2, and "rear" to the right side thereof.

With reference to FIGS. 1 and 2 showing an embodiment of the present invention, a solar water heater 1 comprises a heat collector unit 2 and a hot water storage unit 3 which are fabricated separately first and then combined together. The heat collector unit 2 comprises a casing 4, a heat collector 5 of roll-bonded aluminum material having a condenser portion 5a and serving as a heat pipe with a working fluid enclosed therein, and a heat receiving tank (so-called subtank) 6 in the form of a closed container and placed on the condenser portion 5a, the collector 5 and the tank 6 being housed in the casing 4. Heat insulators 8 of glass wool and foamed synthetic resin are interposed between the collector 5 and the bottom plate 7 of the casing 4. A transparent plate 9 of glass is attached to the upper side of the casing 4.

Figure 4:
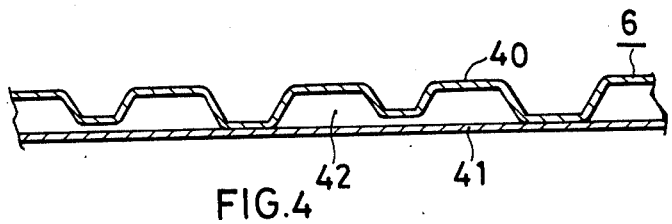
FIG. 4 is an enlarged view in section taken along the line IV—IV in FIG. 3.

The heat receiving tank 6 has a minimized capacity required for heat exchange and is preferably so constructed with a suitable material as to accommodate the thermal expansion of water on freezing. As seen in FIGS. 3 and 4, the tank 6 is prepared from two stainless steel sheets 40, 41 which are formed into a specified shape by press work, by placing one sheet over the other to provide water channels 42 therebetween and welding them together. As shown in FIG. 2, the front end of the heat receiving tank 6 is held in place by a holding member 10 with a packing 11 interposed therebetween. The bottom surface of the tank 6 is in intimate contact with the upper surface of the condenser portion 5a of the collector 5.

The hot water storage unit 3 comprises a case 12, and a hot water tank 14 in the form of a horizontal hollow cylinder with closed ends and housed, as placed on supports 13, in the case 12. The tank 14 is covered with a heat insulator 15.

According to the present embodiment, one hot water storage unit 3 is provided for two heat collector units 2. A supply pipe 16, which is a flexible hose, is connected to a right-end opening 18 of the heat receiving tank 6 of the right collector unit 2a. A return pipe 17 in the form of a flexible hose is connected to a left-end opening 19 of the heat receiving tank 6 of the left collector unit 2b. The opposed ends of the tanks 6, 6 of the two collector units 2a, 2b are in communication with each other through a pair of pipes 20, 21.

With the two heat receiving tanks 6 communicating with the hot water tank 14 through the supply and return pipes 16, 17, the two heat receiving tanks 6 are filled with water from the tank 14. The solar heat absorbed by an evaporator portion 5b of the heat pipe-type collector 5 of each collector unit 2 is transferred by the working fluid to the condenser portion 5a, from which the heat is transferred to the water within heat receiving tank 6 to heat the water. Thus, the water circulates through the heat receiving tanks 6 and the hot water tank 14 via the pipes 16, 17 spontaneously, whereby hot water is stored in the tank 14.

Although two collector units 2 are provided for one hot water storage unit 3 according to the first embodiment described, one or at least three collector units 2 may be provided for one unit 3. Further although the hot water tank 14 is disposed to the rear of the collector units 2, i.e. on the roof, the tank 14 may be provided below the roof. In this case, a pump is provided on an intermediate portion of the piping connecting the tank 14 to the heat receiving tanks 6 to forcibly circulate water.

Figure 6:
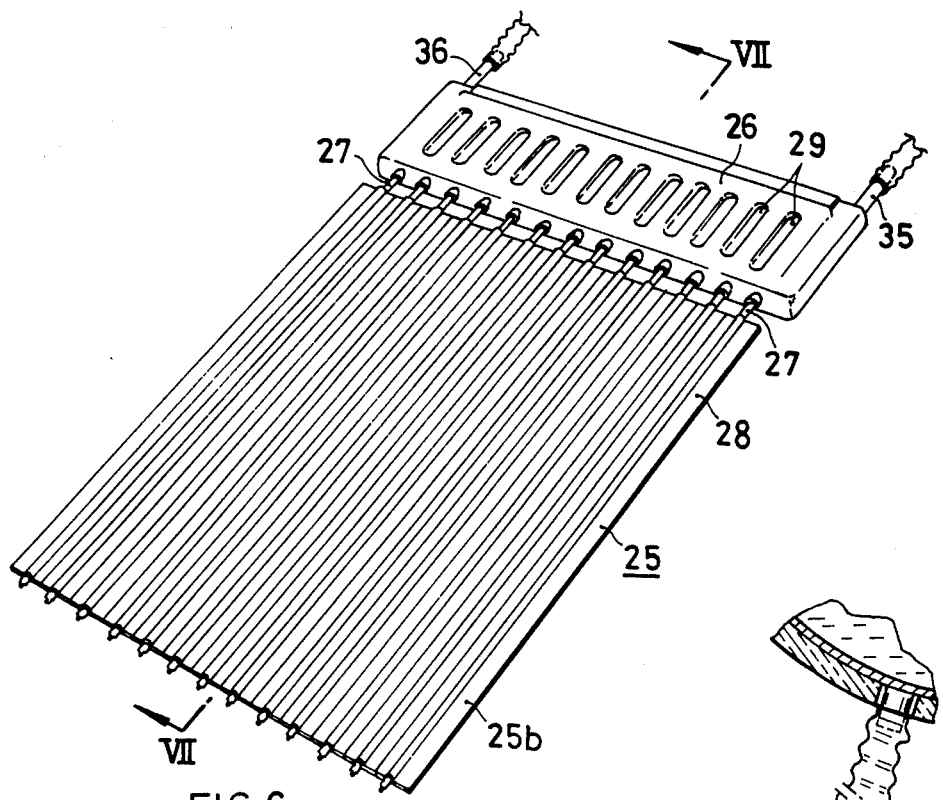
FIG. 6 an enlarged perspective view showing the heat collector and heat receiving tank of FIG. 5.
Figure 7:
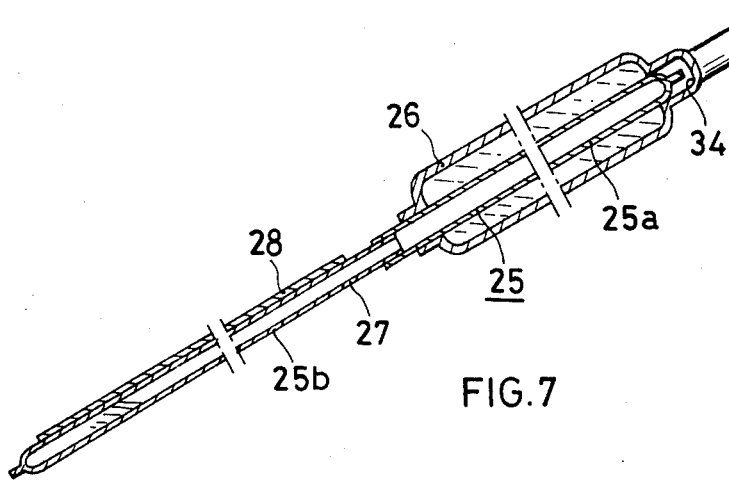
FIG. 7 is an enlarged fragmentary view in section taken along the line VII—VII in FIG. 6.

FIGS. 5 to 7 show another embodiment of the invention, which differs from the first embodiment mainly in that a heat collector 25 of the heat pipe type has a condenser portion 25a which is inserted in a heat receiving tank 26. The heat collector 25 comprises copper tubes 27 having a working liquid enclosed therein, and aluminum fins 28 each attached to the copper tube 27 and having a selective absorption film over its surface. The heat receiving tank 26 is formed from a thermoplastic synthetic resin, such as high-density polyethylene, by blow molding and has a number of recesses 29 in its surface for permitting and effectively accommodating expansion of water on freezing. The tank 26 is formed at its front side with a required number of tubular opening portions 30 for inserting therethrough the condenser portion 25a of the collector 25, i.e. the rear ends of the copper tubes 27. A rubber or synthetic seal cap 31 is fitted around the opening portion 30. At a location close to the front side of the heat receiving tank 26, each copper tube 27 is supported at a lengthwise intermediate portion thereof by a cushioning bearing member 32 on a support member 33 having a U-shaped cross section. The rear end of each copper tube 27 is fitted in and retained by a socket portion 34 U-shaped in cross section and provided within the tank 26 at its rear side. The rear side of the tank 26 is held by a fastening member 37 U-shaped in cross section. Connecting pipes 35, 36 communicating with the tank 26 are attached to the rear side of the tank 26 at its opposite ends. Supply and return pipes 16, 17, which are flexible hoses, are joined to these pipes 35, 36, respectively. Accordingly, the heat receiving tank 26 is filled with water at all times.

With the embodiment described above, each copper tube 27 of the collector 25 is inserted at a lengthwise intermediate portion thereof through the tubular opening portion 30 of the tank 26 and is held at its rear end by the socket portion 34 within the tank 26. Accordingly, the seal portion will not be subjected to a great force but fully retains liquid-tightness even if the assembly is subjected to impact or shaken.

The heat receiving tanks 6, 26 which are covered with the transparent plate 9 according to the foregoing embodiments may be provided with a selective absorption film or black coating film over the surface to achieve a further improved heat collection efficiency.

The heat receiving tanks 6, 26 may be covered with a heat insulating material over the upper surface. This further reduces the heat loss due to the release of heat from the tanks 6, 26 during night.

For reference, indicated at 25b in FIGS. 5 to 7 is the evaporator portion of the heat collector 25.

Figure 8:
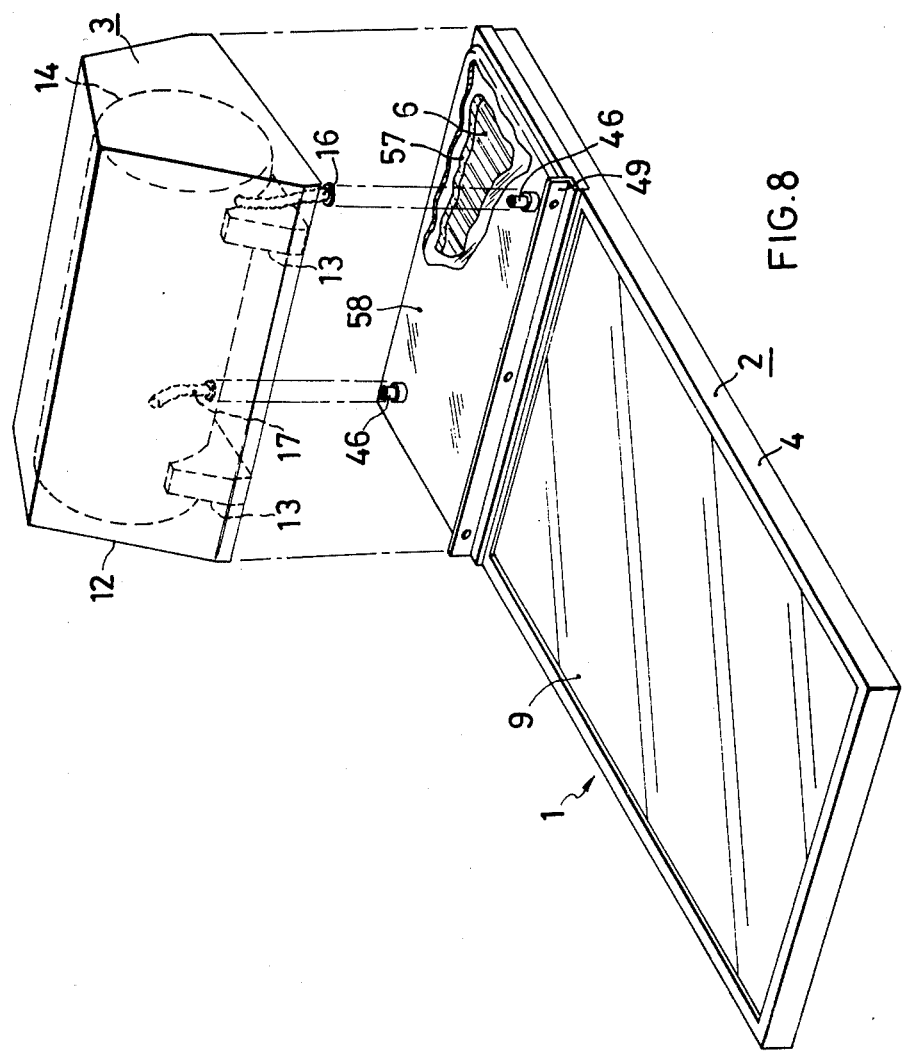
FIG. 8 is an exploded perspective view partly broken away and showing another embodiment of solar water heater of the invention.
Figure 9:
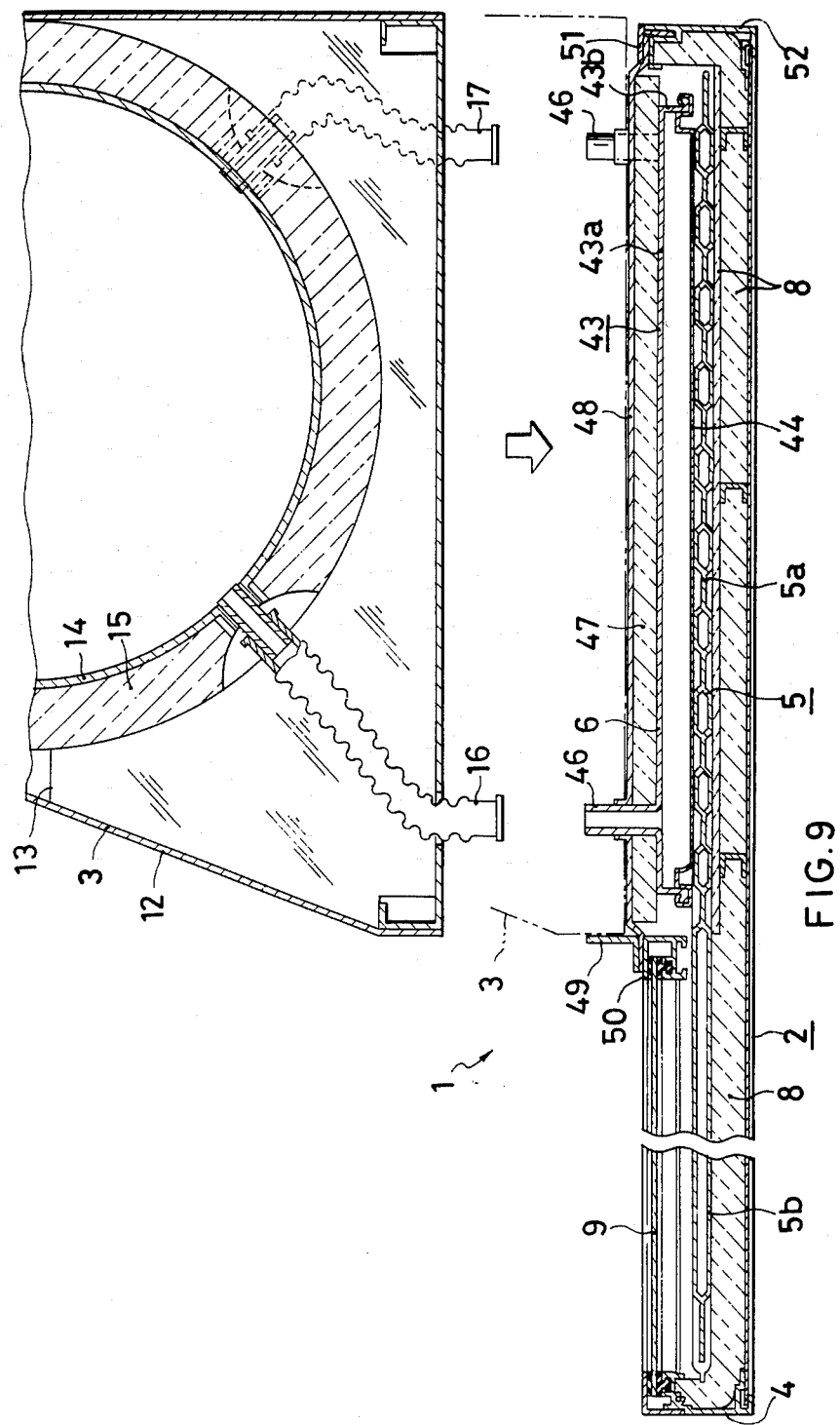
FIG. 9 an enlarged fragmentary view in section showing the heater of FIG. 8.

FIGS. 8 and 9 show another embodiment of the present invention. The heat receiving tank 6 of this embodiment is covered over its upper surface with a heat insulator 47 having resistance to heat and to compression. The heat insulator 47 is covered with an elastic waterproof cover 48 made of synthetic rubber, soft synthetic resin or the like. The front side of the waterproof cover 48 is fixed to a beam 50 by a front holder 49 L-shaped in cross section. The rear side of the cover 48 is fixed to a rear frame member 52 by a rear holder 51 having an inverted L-shaped cross section.

Figure 10:
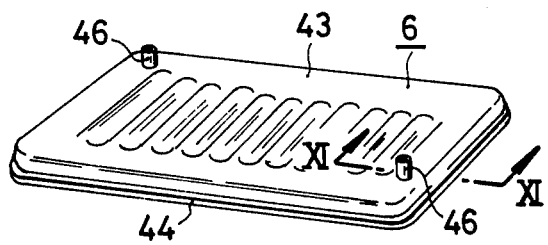
FIG. 10 is a perspective view showing the heat receiving tank only of FIG. 8.
Figure 11:
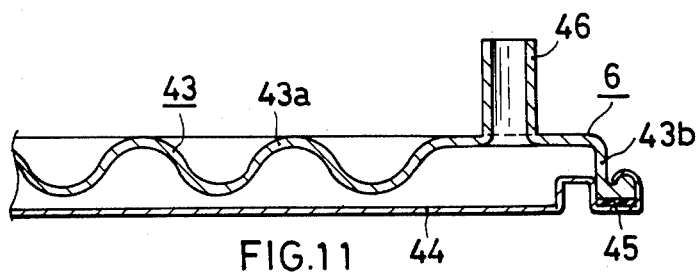
FIG. 11 is an enlarged view in section taken along the line XI—XI in FIG. 10.

With reference to FIGS. 10 and 11, the heat receiving tank 6 comprises a synthetic resin molded body 43 having an upper wall 43a and a peripheral wall 43b, and a bottom plate 44 of stainless steel attached to the molded body 43 with a seal 45 provided therebetween. The molded body 43 is integral with upward tube connectors 46, 46.

The hot water tank 14 of a hot water storage unit 3 is placed over the heat receiving tank 6 constituting a heat collector unit 2, with the heat insulator 47 and the waterproof cover 48 interposed therebetween. The lower surface of the bottom plate 44 of the heat receiving tank 6 is held in intimate contact with the upper surface of the condenser portion 5a of the collector 5 by the gravity acting on the tank 14. This assures very effective heat transfer. The tanks 6 and 14 are held in communication with each other via a supply pipe 16 and return pipe 17 which are flexible hoses.

With the heat receiving tank 6 in communication with the hot water tank 14 through the supply and return pipes 16, 17, the tank 6 is filled with water from the tank 14. The solar heat absorbed by the evaporator portion 5b of the heat pipe-type collector 5 of the unit 2 is transferred by the working fluid to the condenser portion 5a, from which the heat is transferred to the water in the tank 6 for heating. Thus, the water spontaneously circulates through the heat receiving tank 6 and the hot water tank 14 via the supply and return pipes 16, 17, whereby hot water is stored in the tank 14.

Figure 12:
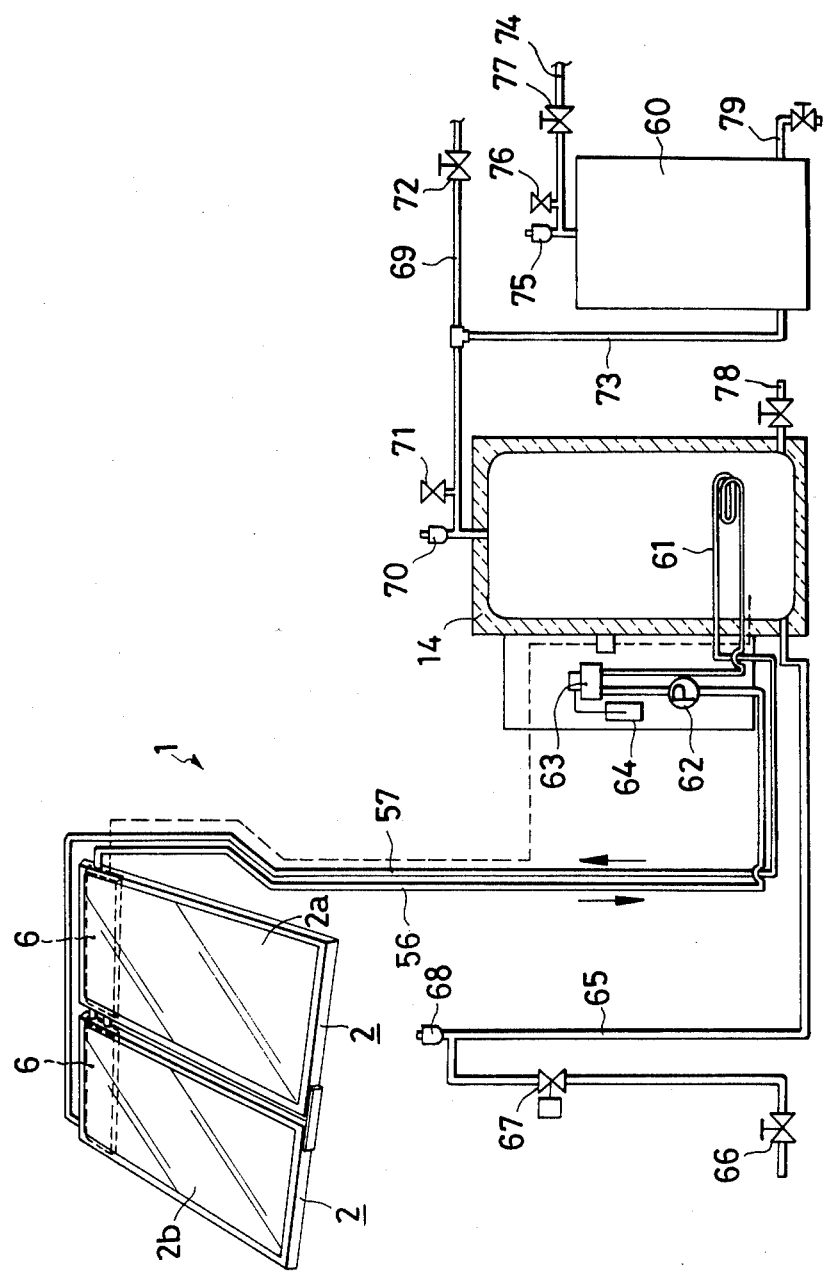
FIG. 12 is a piping system diagram showing another embodiment of solar water heater of the invention.

FIG. 12 shows another embodiment of the invention, i.e. solar water heater 1, which comprises heat collector units 2 on the roof and a hot water tank 14 below the roof. The tank 14 is provided with an electric water heater 60.

Figure 13:
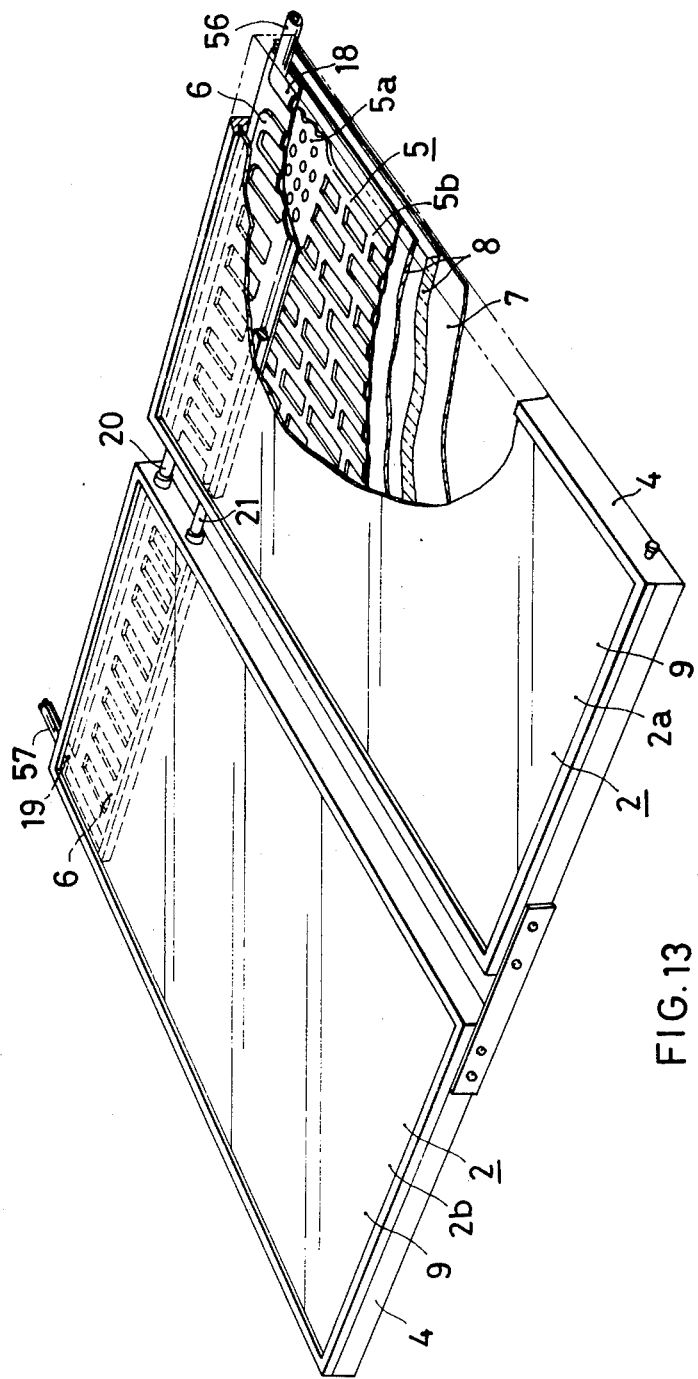
FIG. 13 is an enlarged perspective view partly broken away and showing the solar heat collectors shown in FIG. 12.

With reference to FIG. 13, each collector unit 2 comprises a casing 4, a heat collector 5 of roll-bonded aluminum material having a condenser portion 5a and serving as a heat pipe with a working fluid enclosed therein, and a heat receiving tank (subtank) 6 in the form of a closed container and placed on the condenser portion 5a. The collector 5 and the tank 6 are housed in the casing 4. Heat insulators 8 of glass wool and foamed synthetic resin are interposed between the collector 5 and the bottom plate 7 of the casing 4. A transparent plate 9 of glass is attached to the upper side of the casing 4.

The heat receiving tank 6 has a minimized capacity required for heat exchange. The bottom surface of the tank 6 is in intimate contact with the upper surface of the condenser portion 5a of the collector 5.

The hot water tank 14 is filled with water. Disposed inside the tank 14 at a lower portion thereof is a radiator 61 comprising a coiled tube for heating the water with a heating medium passed therethrough.

According to the present embodiment, a heating medium supply pipe 56 is connected to a right-end opening 18 of the heat receiving tank 6 of the right one 2a of the two collectors 2. A heating medium return pipe 57 is attached to a left-end opening 19 of the tank 6 of the left collector 2b. The opposed ends of the tanks 6, 6 of the two collectors 2a, 2b are in communication with each other through a pair of pipes 20, 21. The forward ends of the supply and return pipes 56, 57 are connected to the radiator 61 of the hot water tank 14. The supply pipe 56 is provided, at an intermediate portion thereof toward the tank 14, with a circulation pump 62, a relief valve 63 for communication with the atmosphere and an expansion tank 64.

Water is supplied to the hot water tank 14 through a water supply pipe 65. The pipe 65 has at intermediate portions thereof a shutoff valve 66, a reduced-pressure check valve 67 and an automatic vent 68 which are arranged in the order mentioned in the direction of flow of water. A first hot water supply pipe 69, which is connected to the top of the water tank 14, is provided at intermediate portions thereof with an automatic vent 70, a pressure regulator valve 71 and a shutoff valve 72 in this order toward the direction of flow of water therethrough. A branch pipe 73 extends from an intermediate portion of the pipe 69 between the valves 71, 72 and is connected to the lower end of the electric water heater 60. A second hot water supply pipe 74 connected to the top of the heater 60 is provided at intermediate portions thereof with an automatic vent 75, a pressure regulator valve 76 and a shutoff valve 77 which are arranged in this order toward the direction of flow of water therethrough. Drain pipes 78, 79 are connected to the lower end of the tank 14 and the lower end of the heater 60, respectively.

With the arrangement described above, the solar heat absorbed by the evaporator portions 5b of the heat collectors 5 of the two collector units 2 is transferred by the working fluid to the condenser portions 5a, from which the heat is transferred to the heating medium, such as antifreeze solution, within the heat receiving tanks 6 to heat the medium. By the operation of the pump 62, the hot medium is sent from the tanks 6 to the radiator 61 in the hot water tank 14 via the supply pipe 56. The medium releases the heat to heat the water within the tank 14. The medium is thereafter returned to the heat receiving tanks 6 by way of the return pipe 57. The heating medium thus forcibly circulated elevates the temperature of the water within the tank 14. The hot water in the tank 14, when having a temperature of not lower than a specified level, is supplied directly to a sink, bathtub or the like via the first hot water supply pipe 69. If otherwise, the water is fed through the branch pipe 73 to the electric heater 60, where it is electrically heated to the specified temperature and then supplied to the sink, bathtub or the like via the second hot water supply pipe 74. The electric heater 60 may be replaced by an oil or gas boiler. One or at least three collector units 2 may be provided instead of the two.

Figure 14:
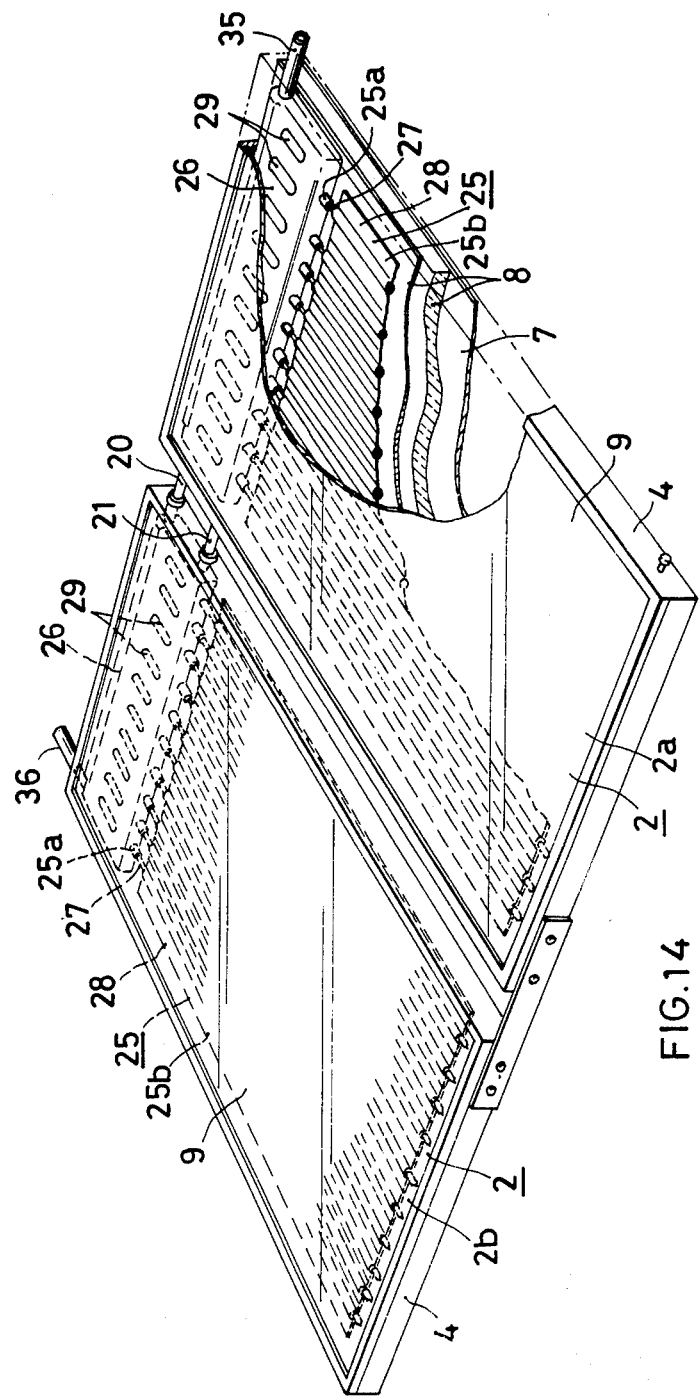
FIG. 14 is an enlarged perspective view partly broken away and showing another embodiment of solar heat collector of tne invention.

FIG. 14 shows another embodiment of heat collector unit, which differs from the one shown in FIG. 13 chiefly in that the heat pipe-type collector 25 of each collector unit 2 has a condenser portion 25a which is inserted in a heat receiving tank 26. The heat collector 25 comprises copper tubes 27 having a working liquid enclosed therein, and aluminum fins 28 each attached to the copper tube 27 and having a selective absorption film over the surface. The heat receiving tank 26 is formed from a thermoplastic synthetic resin, such as high-density polyethylene, by blow molding and has a number of recesses 29 in its surface. Connecting pipes 35, 36 are attached to the right end of the right tank 26 and to the rear side of the left tank 26 at the left end thereof, respectively, in communication with the tanks 26. Supply and return pipes for a heating medium are joined to these connecting pipes 35, 36, respectively.

The heat receiving tanks 6, 26 of FIGS. 13 and 14, which are covered with the transparent plate 9, may be provided with a selective absorption film or black coating film over the surface to achieve a further improved heat collection efficiency.

Figure 15:
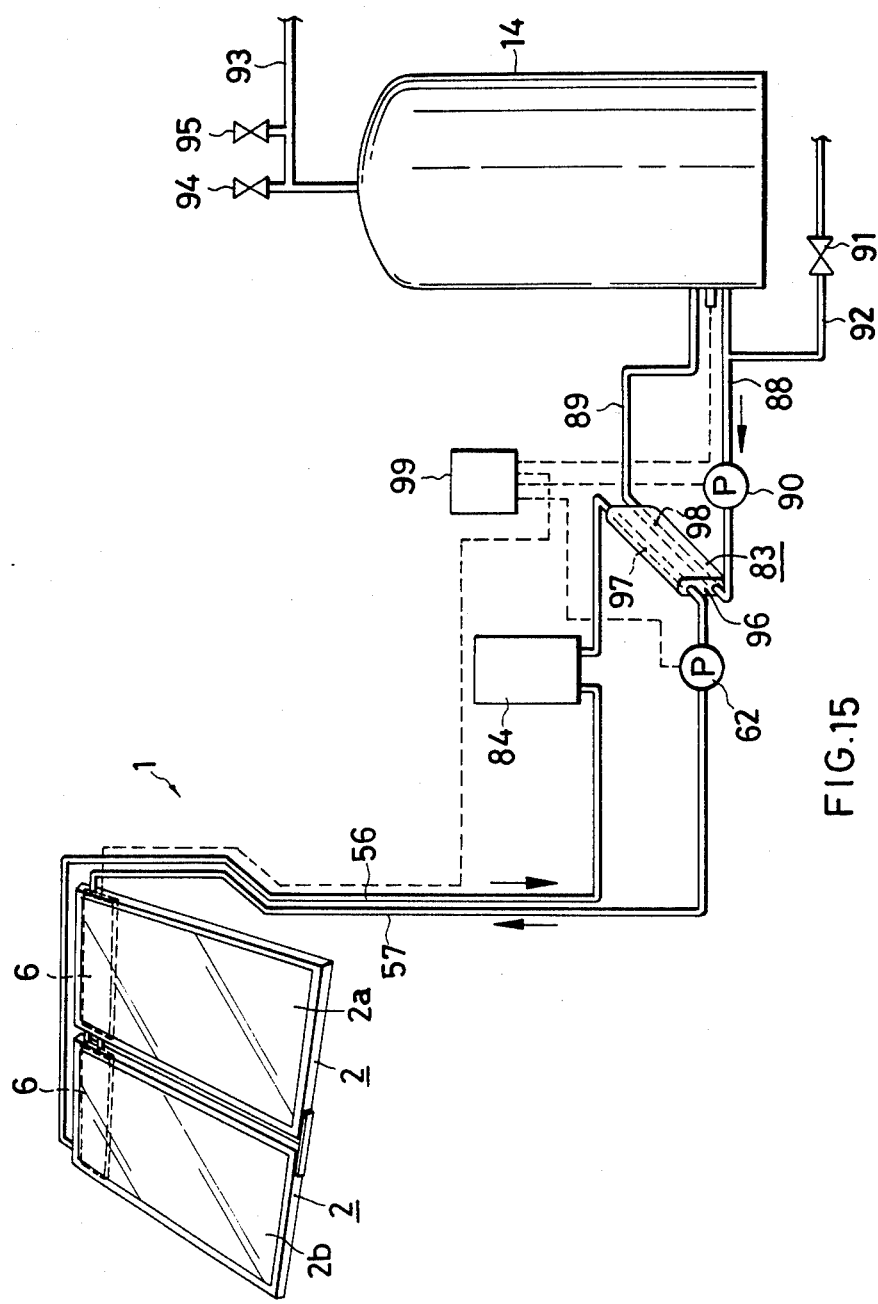
FIG. 15 is a piping system diagram showing another embodiment of solar water heater of the invention.

FIG. 15 shows still another embodiment of the invention, i.e. solar water heater 1, which comprises two heat collector units 2 disposed on the roof, a hot water tank 14 disposed below the roof, and a heat exchanger 83 provided externally of the tank 14 between the tank 14 and the units 2 for effecting heat exchange between a hot heating medium from the collector units 2 and cold water in the tank 14.

Connected to the upper end of the left collector unit 2b at the left side thereof is a supply pipe 56 for feeding a heating medium to the heat exchanger 83 after the medium has been heated while passing through the heat receiving tanks 6 of the units 2. The medium passing through the heat exchanger 83 is returned to the collector units 2 via a return pipe 57 connected to the upper end of the other unit 2a at the right side thereof. The supply pipe 56 is provided at an intermediate portion thereof with an expansion tank 84 for accommodating the expansion of the heated medium. The return pipe 57 has at an intermediate portion thereof a first pump 62 for circulating the heating medium.

Connected to the lower end of the hot water tank 14 are a supply pipe 88 for feeding water of low temperature to the heat exchanger 83 and a return pipe 89 for returning to the tank 14 hot water heated with the heat of the medium while passing through the heat exchanger 83. The supply pipe 88 has a second pump 90 for circulating the water. A water supply pipe 92 provided with a reduced-pressure check valve 91 is connected to the supply pipe 88 for automatically replenishing the tank 14 with water. A hot water supply pipe 93 is connected to the upper end of the tank 14 for supplying hot water from the tank 14 to a sink, etc. The pipe 93 carries an air vent valve 94 and a pressure regulator valve 95.

The heat exchanger 83 comprises a closed body 96, and a cold fluid tube 97 and a hot fluid tube 98 both extending through the body 96, with the former tube positioned above the latter. A working liquid is enclosed in the body 96. However, the heat exchanger 83 is not limited to the illustrated structure but may be of different structure. The solar water heater 1 has a differential temperature controller 99 for automatically operating the pumps 62 and 90 upon detecting the temperature difference between the lower end of the collector unit 2 and the lower end of the hot water tank 14 for the operation of the water heater system.

What is claimed is:

1. A solar water heater comprising:
   a hot water storage tank;
   at least one casing housing a flat heat receiving tank arranged to contain water and a heat collector panel of the heat pipe containing a working fluid, said casing disposed in close proximity to the hot water storage tank, said hot water storage tank being placed on the heat receiving tank in the casing with a heat insulator being interposed between the two tanks; and
   a supply pipe and a return pipe each connecting an interior of the hot water storage tank with an interior of the flat heat receiving tank to allow interchange of water therebetween; wherein
   the heat collector panel has a heat collecting portion and a condenser portion, said condenser portion being in a direct heat exchange relationship with the flat heat receiving tank so that heat is transferred between the working fluid in the condenser portion of the heat collector panel and water in the flat heat receiving tank.

2. A solar water meater according to claim 1 wherein the flat heat receiving tank has a metal bottom wall placed on an upper surface of said condenser portion of said heat collector, and the hot water storage tank is disposed in a rear of said at least one casing.

3. A solar water heater as defined in claim 1 wherein the condenser portion of the heat collector is inserted in the heat receiving tank.

4. A solar water heater as defined in claim 1 wherein a heat insulator is placed over the upper surface of the heat receiving tank.

5. An solar water heater according to claim 1 wherein said at least one casing being in the form of a rectangular parallel piped box, said hot water storage tank being disposed outside in a rear of said casing, said heat receiving tank having a metal bottom wall being placed directly on an upper surface of said condenser portion of said heat collector panel.

6. A solar water heater as defined in claim 5 wherein said hot water storage tank is removably mounted on outside of said casing.

7. A solar water heater as defined in claim 5 wherein said condenser portion of said heat collector panel is inserted in said heat receiving tank.

8. A solar water heater as defined in claim 1 wherein said hot water storage tank is disposed in the rear of a plurality of outer casing disposed in parallel with each other, the heat receiving tanks within adjoining outer casings being communicated with each other through a pair of supply and return pipes, an opening at a right end of the heat receiving tank in the outer casing disposed at a rightmost side with respect to the hot water storage tank being communicated with an opening at a right end of the hot water storage tank by means of one of the pair of supply and return pipes, an opening at a left end of the heat receiving tank in the outer casing disposed at a leftmost side communicating with the opening at a left end of the hot water storage tank by means of the other of the pair of supply and return pipes.

9. A solar water heater comprising:
   a hot water storage tank;
   at least one casing housing a flat heat receiving tank arranged to contain water and a heat collector panel of the heat pipe type containing a working fluid, said casing disposed in close proximity to the hot water storage tank, said hot water storage tank being removably mounted on an outside said casing in the rear of said casing; and
   a supply pipe and a return pipe each connecting an interior of the hot water storage tank with an interior of the flat heat receiving tank to allow interchange of water therebetween; wherein
   the heat collector panel has a heat collecting portion and a condenser portion, said heat receiving tank having a metal bottom wall being placed directly on an upper surface of said condenser portion of said heat condenser portion of said heat collector panel, said condenser portion being in direct heat exchange relationship with the flat heat receiving tank so that heat is transferred between the working fluid in the condenser portion of the heat collector panel and water in the flat heat receiving tank.

* * * * *